US009278752B2

(12) United States Patent
Osvog

(10) Patent No.: US 9,278,752 B2
(45) Date of Patent: Mar. 8, 2016

(54) APPARATUS AND SYSTEM FOR PREVENTING WEAR TO A COMPONENT

(71) Applicant: Andrew J. Osvog, Castaic, CA (US)

(72) Inventor: Andrew J. Osvog, Castaic, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 166 days.

(21) Appl. No.: 14/216,283

(22) Filed: Mar. 17, 2014

(65) Prior Publication Data

US 2015/0259063 A1  Sep. 17, 2015

(51) Int. Cl.
| | |
|---|---|
| *B64C 9/02* | (2006.01) |
| *F16C 9/04* | (2006.01) |
| *F16C 17/04* | (2006.01) |
| *F16C 17/26* | (2006.01) |
| *F16C 25/04* | (2006.01) |
| *F16C 27/02* | (2006.01) |
| *F16C 11/04* | (2006.01) |
| *F16C 11/06* | (2006.01) |
| *F16C 7/02* | (2006.01) |
| *F16C 11/02* | (2006.01) |
| *F16C 17/08* | (2006.01) |

(52) U.S. Cl.
CPC ... *B64C 9/02* (2013.01); *F16C 9/04* (2013.01); *F16C 17/04* (2013.01); *F16C 17/26* (2013.01); *F16C 25/04* (2013.01); *F16C 27/02* (2013.01); *F16C 7/02* (2013.01); *F16C 11/02* (2013.01); *F16C 11/045* (2013.01); *F16C 11/0614* (2013.01); *F16C 17/08* (2013.01); *F16C 2326/43* (2013.01); *Y10T 403/32557* (2015.01)

(58) Field of Classification Search
CPC ..... F16C 11/045; F16C 11/0614; B64C 9/02; B64C 7/00; Y10T 403/32557; Y10T 403/32901; Y10T 403/32852; Y10T 403/32861; Y10T 403/32951; Y10T 403/32926; Y10T 403/32918
See application file for complete search history.

(56) References Cited

U.S. PATENT DOCUMENTS

| | | | |
|---|---|---|---|
| 2,580,176 A | | 12/1951 | Johnson |
| 4,072,431 A | | 2/1978 | Waight et al. |
| 4,578,849 A | * | 4/1986 | Kaufman ............... F16J 1/16 29/434 |
| 4,759,515 A | | 7/1988 | Carl |
| 4,824,326 A | | 4/1989 | Watts |
| 6,033,182 A | | 3/2000 | Rampal |

(Continued)

FOREIGN PATENT DOCUMENTS

| | | | |
|---|---|---|---|
| EP | 1 302 680 A2 | 4/2003 | ............ F16C 11/04 |
| FR | 2 928 982 A1 | 9/2009 | ............ F16B 21/20 |

(Continued)

OTHER PUBLICATIONS

EPO Germany Communication regarding extended European search report; Appl. No. 15159456.1-1754; Ref. EP98767PE302cho; Aug. 20, 2015 (File Ref No. 080663. 0179).

*Primary Examiner* — Daniel Wiley
(74) *Attorney, Agent, or Firm* — Baker Botts L.L.P.

(57) ABSTRACT

In an embodiment, a system may include an aircraft clevis comprising two opposite sides and a longitudinal axis located between the two opposite sides. The longitudinal axis may be parallel to the two opposite sides. The system may include a slider positioned within the aircraft clevis and along the longitudinal axis. The system may include a clip configured to prevent the slider from rotating about the longitudinal axis by having at least a first portion of the clip coupled to one of the two opposite sides of the aircraft clevis and at least a second portion of the clip in contact with the slider.

20 Claims, 7 Drawing Sheets

(56) References Cited

U.S. PATENT DOCUMENTS

| | | | |
|---|---|---|---|
| 6,371,681 B1 | 4/2002 | Covington et al. | |
| 6,474,898 B1 * | 11/2002 | Aota | F16D 1/0864 403/12 |
| 7,338,011 B2 | 3/2008 | Pauly | |
| 8,038,093 B2 | 10/2011 | Llamas Sandin et al. | |
| 8,197,153 B2 | 6/2012 | Halcom et al. | |
| 8,511,611 B2 * | 8/2013 | Blades | B64C 7/00 244/130 |
| 9,150,302 B2 * | 10/2015 | Wildman | B64C 9/02 |
| 2002/0125049 A1 * | 9/2002 | Kajiyama | B60N 2/0705 177/136 |
| 2005/0196227 A1 * | 9/2005 | Mahy | F16C 11/0614 403/122 |
| 2005/0271494 A1 | 12/2005 | Hidalgo et al. | |
| 2010/0180703 A1 | 7/2010 | Yim | |
| 2012/0051906 A1 | 3/2012 | House et al. | |
| 2013/0105636 A1 | 5/2013 | Day et al. | |

FOREIGN PATENT DOCUMENTS

| | | |
|---|---|---|
| JP | 03167098 A | 7/1991 |
| WO | WO 2012/062620 A1 | 5/2012 |

\* cited by examiner

APPARATUS AND SYSTEM FOR PREVENTING WEAR TO A COMPONENT

GOVERNMENT INTEREST

This invention was made with government support under Contract No. N00019-02-C-3002 awarded by The Department of Defense. The government has certain rights in the invention.

TECHNICAL FIELD

This disclosure generally relates to mechanical systems, and more particularly to an apparatus and system for preventing wear to a component.

BACKGROUND

Mechanical systems, such as an aircraft, automobile, or watercraft, often have components that are free to rotate Due to various forces occurring during operation of those systems, a component may rotate into another structural component of the system. The rotating component may damage or wear itself or the other structural component. As a result, the damaged or worn components must be replaced at a cost to the operator of the system. Moreover, workers must spend significant time inspecting for damage in areas known to have rotating components.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
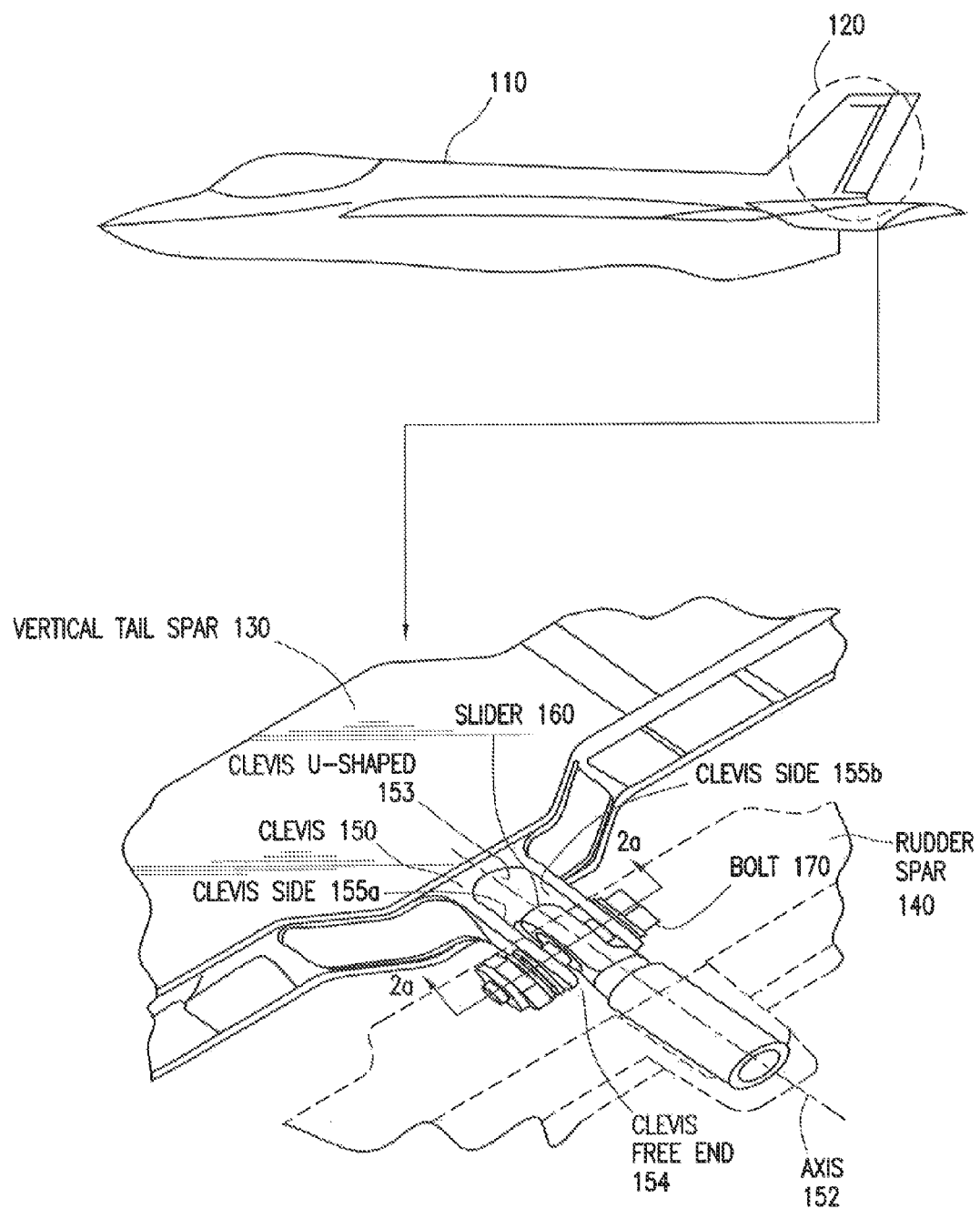
FIG. 1 illustrates an example mechanical system with an area having an example rotating component that may appear in an example mechanical system, according to certain embodiments of the present disclosure.

Generally, various forces in a mechanical system may cause undesirable rotation of some components that are free to rotate. For example, an aircraft may have a component, such as a slider, positioned within a clevis that transfers forces between a vertical tail spar and a rudder spar. However, due to forces exerted on the aircraft during operation, such as vibration, the component may rotate into the clevis because no other component prevents the rotation. When the component rotates into the clevis, the component may damage itself or the clevis.

Some mechanical systems may attempt to prevent damage to the structural components using a sacrificial part, such as an integral clevis pad or a washer. However, those parts do not prevent rotation because they do not maintain contact with both the rotating component and the adjacent structural component—instead, they merely reduce the damage to the structural component or the rotating component by absorbing the impact. Since the sacrificial parts absorb impact rather than prevent rotation, they become damaged from the rotating component's repeated impacts. Damage to the sacrificial part increases the likelihood that further impacts may damage the clevis or the rotating part and necessitates periodic inspections.

Accordingly, aspects of the present disclosure include, in one embodiment, an apparatus that is operable to prevent the slider from contacting an aircraft clevis. The apparatus may include a first member and a second member for positioning the apparatus between a first arm and a second arm of an aircraft clevis. The first member and the second member are each positioned on opposite sides of a longitudinal axis and the longitudinal axis is parallel to at least a portion of the first member and the second member and substantially midway between the first member and the second member. The first member and the second member form an opening at a first end, and the opening is configured to receive a slider positioned along the longitudinal axis. The apparatus may include a u-shaped member coupling the first member and the second member at a second end that is opposite to the first end. The apparatus includes a first prong protruding from a top portion of the first member towards the longitudinal axis with at least a portion of the first prong for contacting the slider. The apparatus includes a second prong protruding from a bottom portion of the first member towards the longitudinal axis with at least a portion of the second prong for contacting the slider. The apparatus includes a first aperture and a second aperture configured to receive a bolt and positioned proximate to the first end. The apparatus includes a third prong protruding from a top portion of the second member towards the longitudinal axis with at least a portion of the third prong for contacting the slider and a fourth prong protruding from a bottom portion of the second member towards the longitudinal axis with at least a portion of the fourth prong for contacting the slider. Moreover, at least a portion of the first member is for coupling to the first arm of the aircraft clevis.

The apparatus provides numerous advantages. For example, the apparatus may resist rotation of one component into an adjacent structural component thereby preventing damage to both components. Additionally, preventing damage to these components will save replacement-part costs and increase workplace efficiency due to the elimination of the need to periodically inspect the often-damaged components. Moreover, the apparatus does not itself wear because it is not repeatedly abraded. Accordingly, the apparatus eliminates the need for a sacrificial part, such as a wear washer or an integral clevis pad (which may not maintain contact with both the clevis and the slider). Another advantage of the apparatus is that it centers a component that has a tendency to rotate due to its operating environment, thereby providing an optimal alignment of that component. Yet another advantage of the apparatus is that its weight is typically less than the weight of traditional sacrificial parts because it is not repeatedly abraded thereby eliminating the need for a thick part.

Figure 2A:
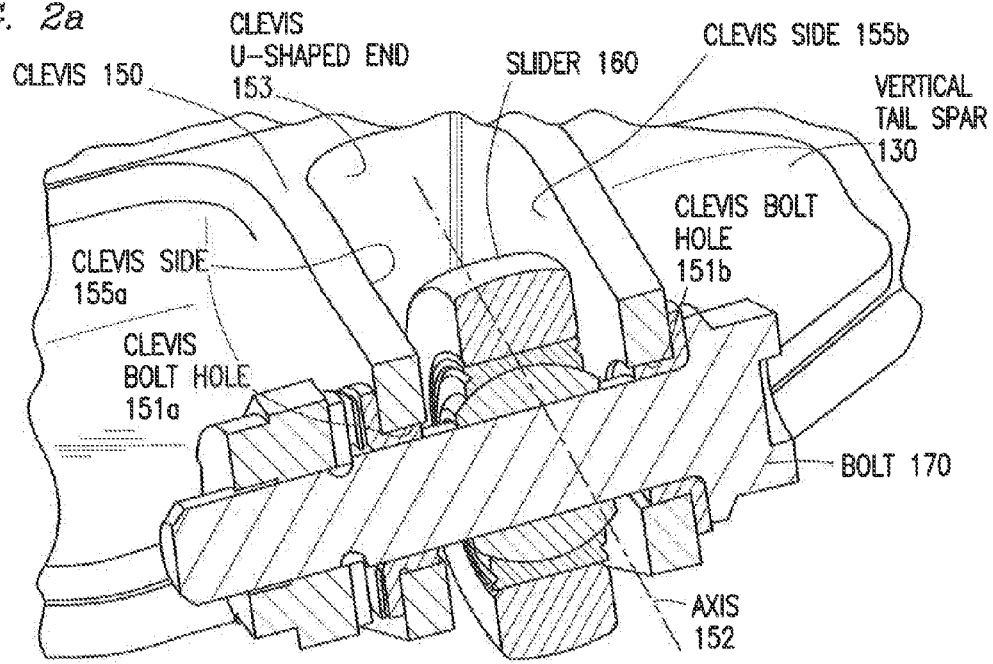
FIG. 2a is a section view along section 2a-a of FIG. 1 illustrating an example slider in an upright position, according to certain embodiments of the present disclosure.
Figure 2B:
FIG. 2b is a section view along section 2a-a of FIG. 1 illustrating an example slider in a rotated position, according to certain embodiments of the present disclosure.
Figure 2B:
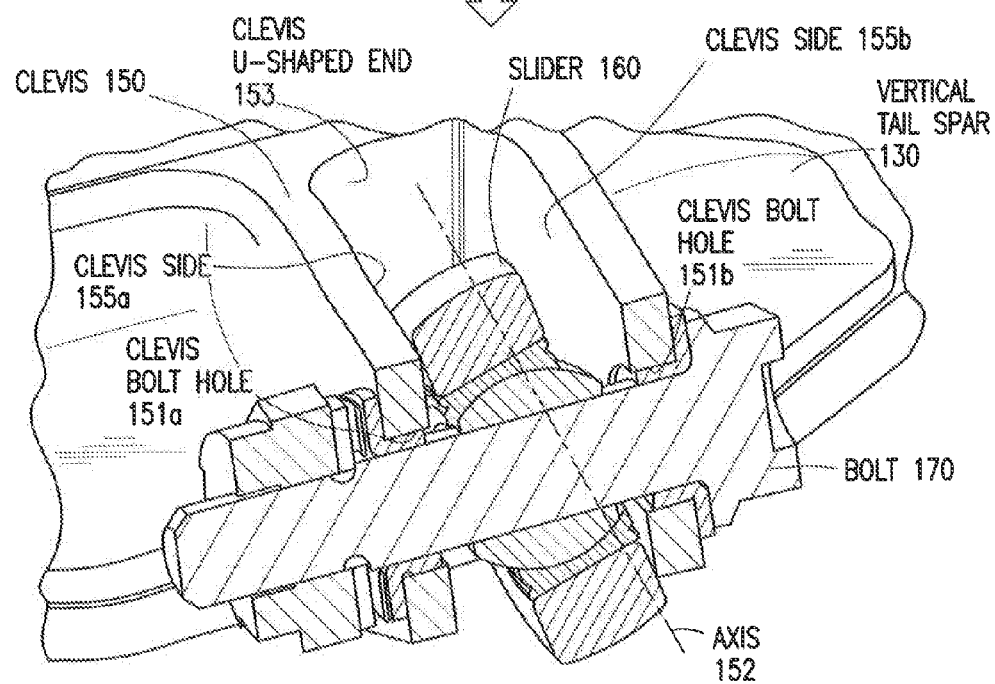
Figure 3:
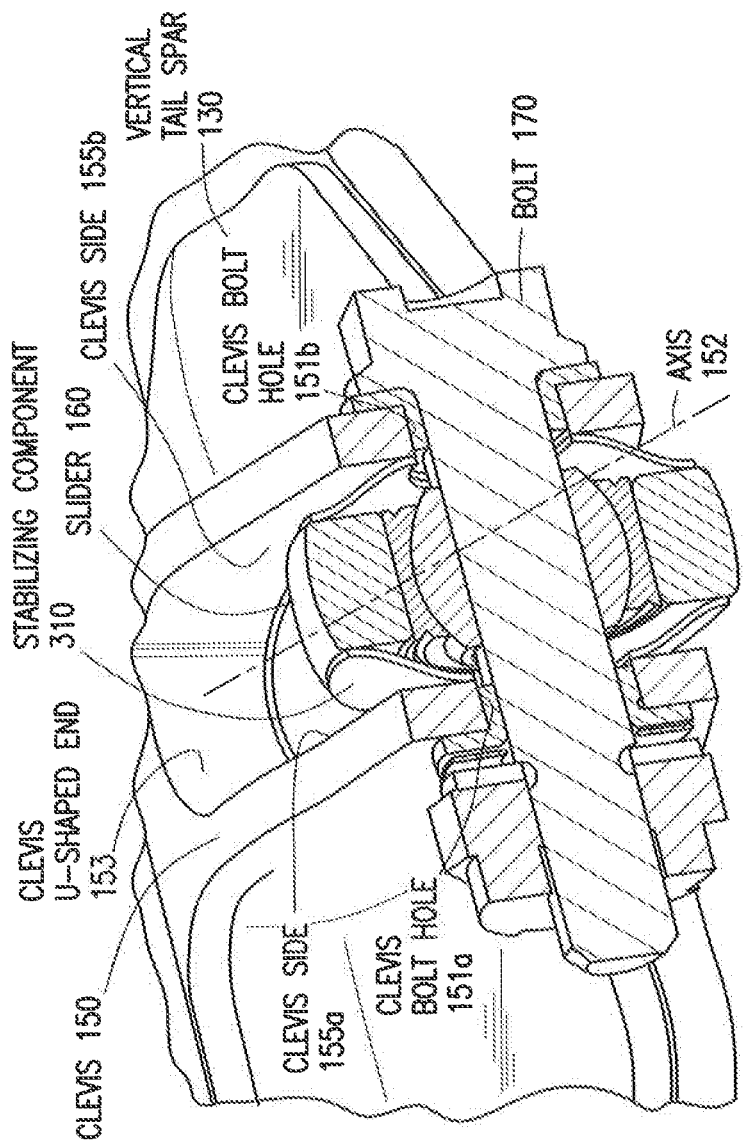
FIG. 3 is a section view along section 2a-a of FIG. 1 illustrating an example slider with an example stabilizing component, according to certain embodiments of the present disclosure.

Additional details are discussed in FIGS. 1 through 4d. FIG. 1 shows an example mechanical system with an area having an example rotating component that may appear in an example mechanical system. FIG. 2a shows a section view of an example slider in an upright position, and FIG. 2b shows a section view of an example slider in a rotated position. FIG. 3 shows an example stabilizing component that may be used to prevent rotation in a mechanical system. FIGS. 4a-d show various views of an example stabilizing component that may be used to prevent rotation in a mechanical system.

FIG. 1 illustrates an example mechanical system 110 with area 120 having an example rotating component, according to certain embodiments of the present disclosure. Mechanical system 110 may be any mechanical system having rotating components. For example, mechanical system 110 may be an aircraft, a vehicle, a boat or a helicopter. Mechanical system 110 may have a variety of parts that are free to rotate due to operational forces. For example, an aircraft may have various parts that rotate due to vibrational forces in the aircraft's high-vibration environment, such as the components in area 120.

Area 120 of mechanical system 110 (illustrated as an aircraft in this example) includes vertical tail spar 130, rudder spar 140, clevis 150, slider 160, and bolt 170 in certain embodiments. Although area 120 is illustrated as an area of an aircraft in this example embodiment, area 120 may be any area of a mechanical system having rotating components Although the rotating component may be any rotating component, it will be discussed with reference to slider 160. In an embodiment, vertical tail spar 130 may be coupled to rudder spar 140 using clevis 150, slider 160, and bolt 170. Slider 160 may be coupled to clevis 150 using bolt 170 in some embodiments. Slider 160 may be attached to a spherical bearing in some embodiments.

Vertical tail spar 130 and rudder spar 140 may be a structural member of an aircraft in an embodiment. For example, vertical tail spar 130 may be a structural member located in the tail area of an aircraft for carrying various loads of the aircraft. In some embodiments, vertical tail spar 130 and rudder spar 140 may be made of a metal. In other embodiments, vertical tail spar 130 and rudder spar 140 may be a composite material. Although area 120 is illustrated as having vertical tail spar 130 and rudder spar 140 in this embodiment, other mechanical systems may not include vertical tail spar 130 and rudder spar 140, such as a boat or a car. As noted above, vertical tail spar 130 and rudder spar 140 are coupled together by clevis 150, slider 160, and bolt 170.

Clevis 150 may be any component used to couple other components together in certain embodiments. For example, clevis 150 may couple vertical tail spar 130 to rudder spar 140. Clevis 150 may have oppositely disposed clevis sides 155a-b, with axis 152 located between clevis sides 155a-b in an embodiment. In that embodiment, axis 152 may be parallel to clevis sides 155a-b. Clevis 150 may have clevis u-shaped end 153 in some embodiments. At an end opposite to clevis u-shaped end 153, clevis 150 may have a free end. In some embodiments, clevis 150 may have holes 151a-b through which bolts are inserted. Clevis 150 may be made of any material, such as metal or plastic. Clevis 150 may be an aircraft clevis in an embodiment. In other embodiments, clevis 150 may be any type of clevis. For example, clevis 150 may be located in a boat or a car.

Slider 160 may be any component used to transfer loads between components in an embodiment. For example, slider 160 may transfer loads from rudder spar 140 to vertical tail spar 130. In certain embodiments, slider 160 may be any component used to resolve misalignment. In other embodiments, slider 160 may be any rotating component. For example, slider 160 may be a swing linkage or an actuator push rod. In some embodiments, slider 160 may be a rod-end pin with a bearing. Slider 160 may be coupled to a spherical bearing in some embodiments. In an embodiment, slider 160 may be positioned within the aircraft clevis. For example, slider 160 may be positioned between two longitudinal arms of clevis 150. In that example, while slider 160 is positioned between the two longitudinal arms of clevis 150, portions of slider 160 may extend beyond the two longitudinal arms. In some embodiments, however, portions of slider 160 may not extend beyond the two longitudinal arms of clevis 150. In an embodiment, slider 160 is positioned on a longitudinal axis of clevis 150 (discussed above). For example, slider 160 may be positioned on a longitudinal axis in the center of the two longitudinal arms of clevis 150. As another example, slider 160 may be positioned on a longitudinal axis that is slightly off-centered between the two longitudinal arms of clevis 150. Slider 160 is coupled to clevis 150 using bolt 170 in some embodiments.

Bolt 170 may be any standard bolt in some embodiments. In other embodiments, bolt 170 may be any fastener, such as a screw, a dowel, a rivet, or a pin. While bolt 170 couples clevis 150 and slider 160, bolt 170 also transfers loads between vertical tail spar 130 and rudder spar 140.

FIG. 2a is a section view along section 2a-a of FIG. 1 illustrating an example slider in an upright position, according to certain embodiments of the present disclosure. As noted above, slider 160 may be oriented along a longitudinal axis that is in the center of two longitudinal arms of clevis 150. Often, mechanical components, such as slider 160 in an embodiment, may be free to rotate within another component, such as clevis 150, as a result of various forces exerted on mechanical system 110. For example, various vibrational forces exerted on a aircraft may cause slider 160 to rotate within clevis 150 and collide with clevis 150 as shown in FIG. 2b.

FIG. 2b is a section view along section 2a-a of FIG. 1 illustrating an example slider in a rotated position, according to certain embodiments of the present disclosure. As mentioned above, various vibrational forces exerted on mechanical system 110 may cause rotation of slider 160 into clevis 150. As a result of the repeated impact of slider 160 with clevis 150, many unwanted results may occur. For example, damage to slider 160 or clevis 150 can result thereby requiring replacement of these components. As another example, due to the potential for damage, the components must be inspected periodically thereby reducing workplace efficiency.

FIG. 3 is a section view along section 2a-a of FIG. 1 illustrating an example slider 160 with an example stabilizing component 310, according to certain embodiments of the present disclosure. Stabilizing component 310 may prevent a component from rotating so that the rotating component does not collide with other components of a system. For example, stabilizing component 310 may be positioned within clevis 150 to prevent slider 160 from rotating into clevis 150. Stabilizing component 310 may be coupled to clevis 150 with any appropriate fastener or material in an embodiment. For example, stabilizing component 310 may be coupled to clevis 150 using an adhesive. As another example, stabilizing component 310 may be coupled to clevis 150 using a sealant, such as polysulfide. In some embodiments, the adhesive or sealant may be applied to portions of the interior wall of clevis 150 that contact an exterior surface (i.e., the surface facing the interior wall of clevis 150) of stabilizing component 310.

Stabilizing component 310 may also be in contact with a rotating component, such as slider 160, in an embodiment. For example, as discussed in detail below, stabilizing component 310 may have multiple prongs that maintain contact with slider 160. In an embodiment, stabilizing component 310 may be a clip configured to prevent slider 160 from rotating about a longitudinal axis of clevis 150 by having at least a portion of the clip coupled to one of the two opposite sides of clevis 150 and at least a second portion of the clip in contact with slider 160. Because stabilizing component 310 maintains contact with slider 160 and is coupled to clevis 150, stabilizing component 310 prevents slider 160 from rotating within clevis 150. In that manner, stabilizing component 310 may prevent damage to various components, such as clevis 150 and slider 160, thereby saving replacement costs and increasing workplace efficiency by eliminating the need for periodic inspections.

Figure 4A:
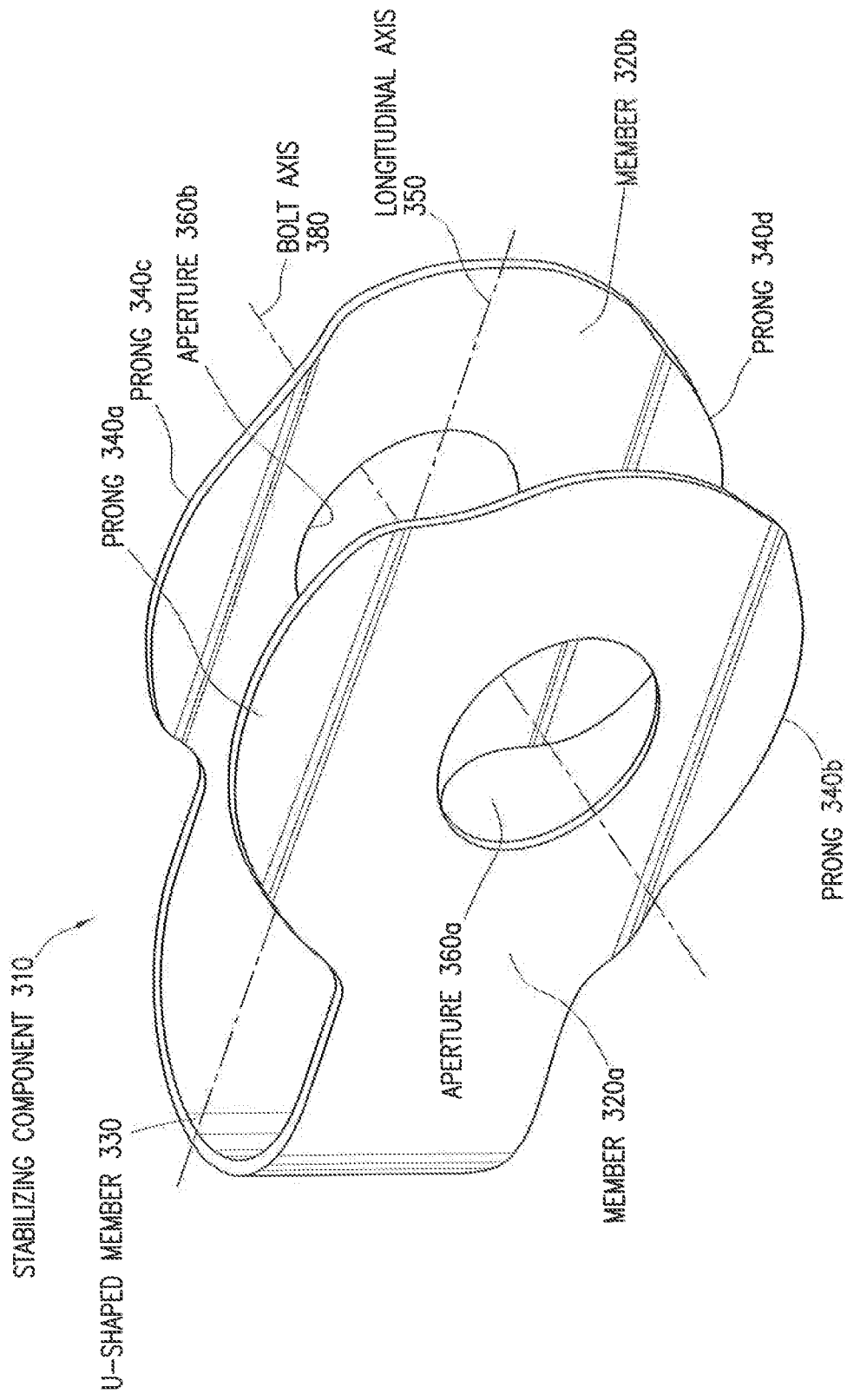
FIG. 4a is an isometric view of an example stabilizing component, according to certain embodiments of the present disclosure.
Figure 4B:
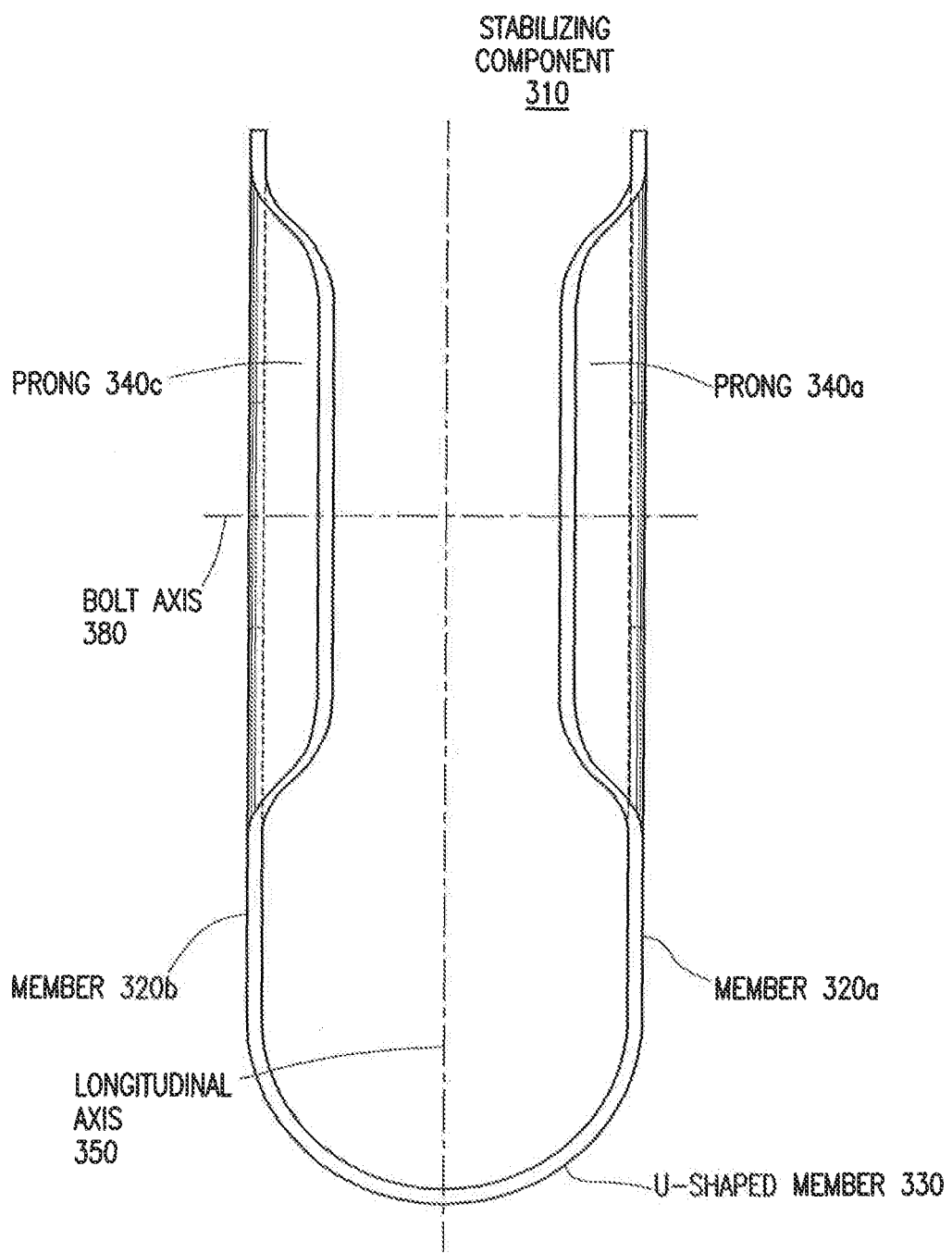
FIG. 4b is a top view of the stabilizing component of FIG. 4a, according to certain embodiments of the present disclosure.
Figure 4C:
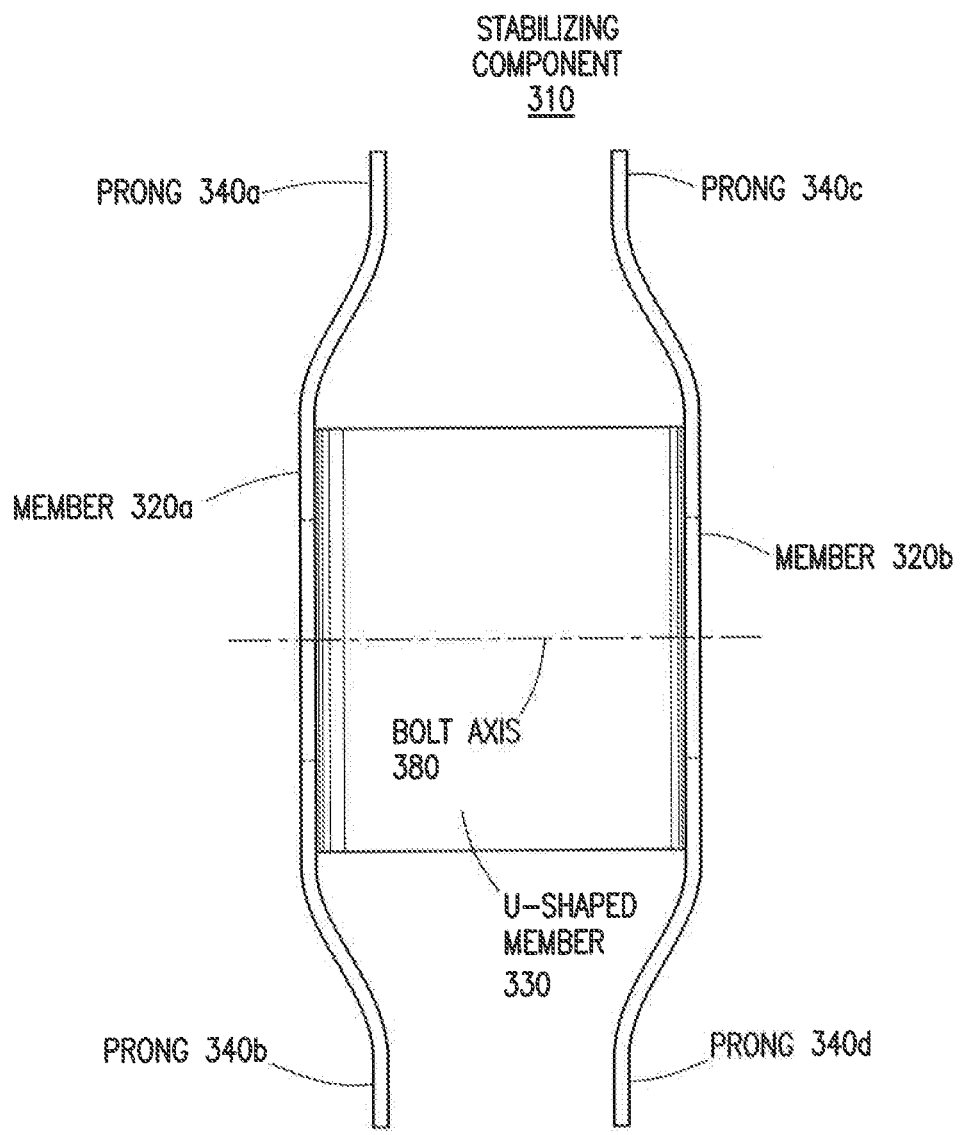
FIG. 4c is a front view of the stabilizing component of FIG. 4a, according to certain embodiments of the present disclosure.
Figure 4D:
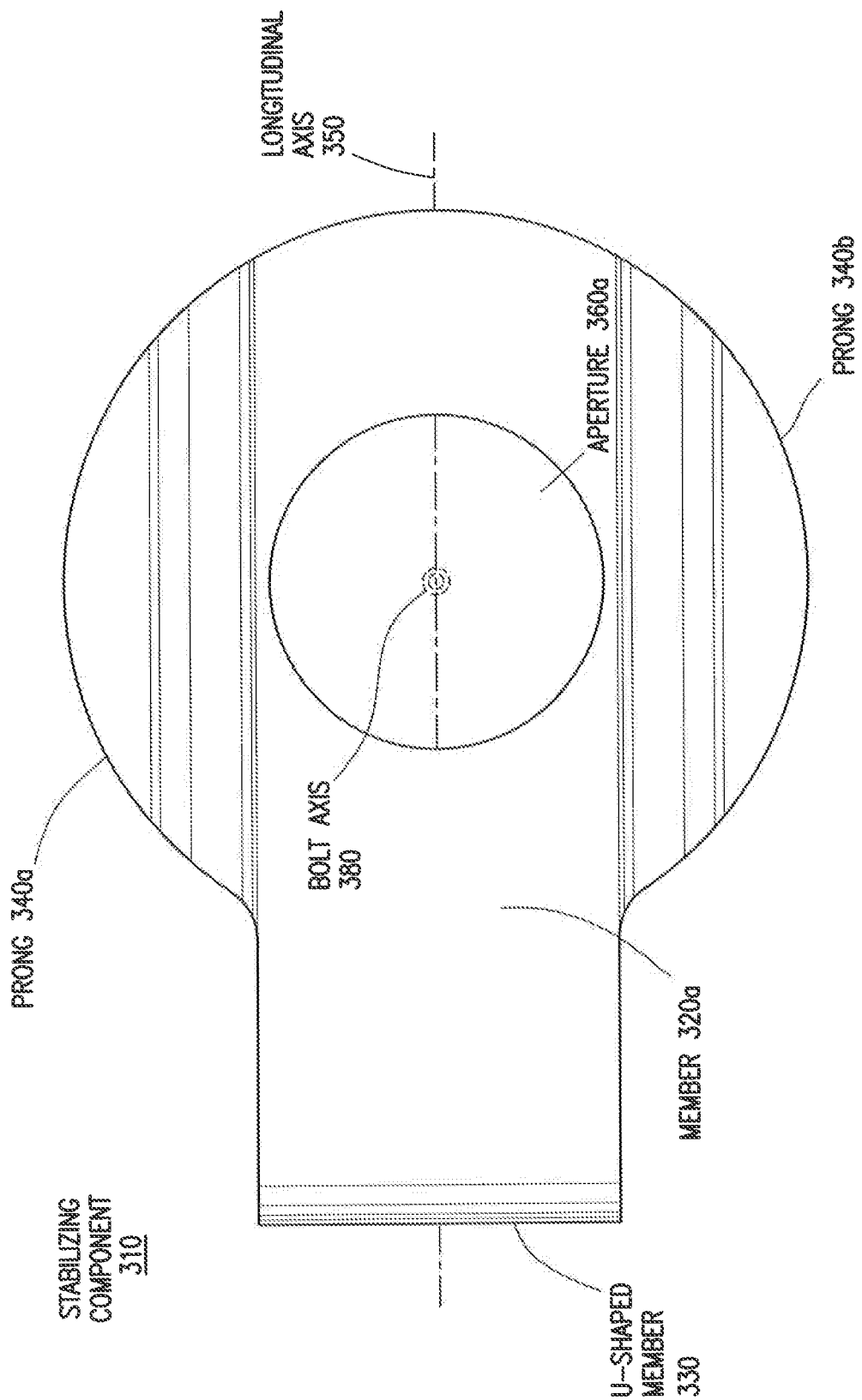
FIG. 4d is a side view of the stabilizing component of FIG. 4a, according to certain embodiments of the present disclosure.

FIGS. 4a-4d illustrate different views of stabilizing component 310, according to certain embodiments of the present disclosure. FIG. 4a is an isometric view of an example stabilizing component 310; FIG. 4b is a top view of an example stabilizing component 310; FIG. 4c is a front view of an example stabilizing component 310; and FIG. 4d is a side view of an example stabilizing component 310. Stabilizing component 310 is discussed with respect to FIGS. 4a-4d. Stabilizing component 310 may include members 320a-b, u-shaped member 330, prongs 340a-d, longitudinal axis 350, and apertures 360a-b.

Members 320a-b may be a first or second member positioned on opposite sides of longitudinal axis 350 in an embodiment. Members 320a-b are generally positioned parallel to each other and to longitudinal axis 350. In some embodiments, members 320a-b are each equidistant from longitudinal axis 350. Members 320a-b may extend longitudinally in a direction parallel to longitudinal axis 350. Members 320a-b may have a length greater than their height in certain embodiments. Generally, members 320a-b have an exterior wall that couples to another component using a fastener, an adhesive, or a sealant. For example, an exterior wall of members 320a-b may couple to an interior wall of clevis 150 using a sealant. In some embodiments, not all of the entire members 320a-b may couple to the wall of another component. For example, a portion of member 320a may couple to one side of an aircraft clevis arm, while a portion of member 320b may couple to an oppositely disposed side of an aircraft clevis arm. In other embodiments, members 320a-b may be coupled to clevis 150 using a fastener, such as a bolt, a pin, a rivet, a screw, or any other fastener. Members 320a-b may be made of any material, such as a metal, plastic, or composite material. For example, members 320a-b may be made of spring steel. In an embodiment, the interior and/or exterior of members 320a-b may include an abrasion-resistant finish to prevent wear. For example, the abrasion-resistant finish may be a Teflon® coating. As another example, the abrasion-resistant finish may be a smooth surface finish. As yet another example, the abrasion-resistant finish may be a chrome plating. Members 320a-b may form an opening at an end opposite to u-shaped member 330 in an embodiment. Members 320a-b are joined at u-shaped member 330 in certain embodiments.

U-shaped member 330 couples member 320a to member 320b in an embodiment. Generally, u-shaped member 330 may be shaped based on the shape of the structural component within which it is positioned. For example, u-shaped member 330 may have a u-shaped curve as shown in the embodiment of FIG. 4b. U-shaped curve allows stabilizing component 310 to match the structure of clevis 150 in an embodiment. As another example, u-shaped member 330 may have square edges rather than curved edges. U-shaped member 330 may have the same height as members 320a-b in an embodiment. Members 320a-b and u-shaped member 330 may be a single integral component in an embodiment. In other embodiments, u-shaped member 330 may be a separate component that couples member 320a to member 320b. U-shaped member 330 may be made of the same material as members 320a-b in an embodiment. For example, u-shaped member 330 may be made of a metal (e.g., spring steel), plastic, or composite material. In an embodiment, the interior and/or exterior of u-shaped member 330 may include an abrasion-resistant finish to prevent wear. For example, the abrasion-resistant finish may be a Teflon® coating. As another example, the abrasion-resistant finish may be a smooth surface finish. As yet another example, the abrasion-resistant finish may be a chrome plating.

Prongs 340a-d generally are adapted to maintain contact with another component to prevent that component from rotating. For example, prongs 340a-d may each maintain contact with at least a portion of slider 160 to prevent slider 160 from rotating into clevis 150. In addition, prongs 340a-d may maintain a component's position along longitudinal axis 350. For example, prongs 340a-d may maintain an upright position of slider 160 along or on longitudinal axis 350. Prongs 340a-b may protrude from member 320a, and prongs 340c-d may protrude from member 320b in an embodiment. In some embodiments, there may be a small gap between slider 160 and prongs 340a-d for installation tolerance relief. Prongs 340a and 340c may protrude upward from a top portion of member 320a and member 320b, respectively, and inward towards longitudinal axis 350. Prongs 340b and 340d may protrude downward from a bottom portion of member 320a and member 320b, respectively, and inward towards longitudinal axis 350. In some embodiments, prongs 340a-d may be prewarped to ensure that prongs 340a-d maintain contact with slider 160. Although illustrated in FIGS. 4a-4d as including four prongs, any number of prongs may be used.

Prongs 340a-d may be any shape required to maintain contact with another component. The shape of prongs 340a-d may be configured according to how much contact is needed between prongs 340a-d and a rotating component, such as slider 160. In an embodiment, prongs 340a-d may have a wave shape. For example, the wave shape may be a straight wave as illustrated by prongs 340a-d in FIG. 4c. In that example, the straight wave is the substantially straight portion of prongs 340a-d. Prongs 340a-d may contact another component in the straight portion of the wave. As another example, the wave shape may be a circular wave. As yet another example, prongs 340a-d may be tapered inwards towards longitudinal axis 350 to contact a rotating component, such as slider 160, at an angle. Although discussed as a wave shape, any shape adapted to maintain contact with another component can be used, such as an arch shape.

Prongs 340a-d may be made of the same material as members 320a-b and u-shaped member 330 in an embodiment. For example, prongs 340a-d may be made of any metal (e.g., spring steel), plastic, or composite material. In an embodiment, the interior and/or exterior of prongs 340a-d may include an abrasion-resistant finish to prevent wear to prongs 340a-d and the rotating component, such as slider 160. For example, the abrasion-resistant finish may be a Teflon® coating. As another example, the abrasion-resistant finish may be a smooth surface finish. As yet another example, the abrasion-resistant finish may be a chrome plating.

Longitudinal axis 350 may be positioned substantially midway between members 320a-b in an embodiment. In some embodiments, longitudinal axis 350 may be parallel to at least a portion of members 320a-b. Longitudinal axis 350 may also be parallel to the two oppositely disposed arms of clevis 150. Longitudinal axis 350 may be on the same axis as axis 152 in an embodiment.

Aperture 360a and aperture 360b may be located on members 320a and 320b, respectively, in certain embodiments. In an embodiment, apertures 360a-b may be positioned near an end that is opposed to u-shaped member 330. Apertures 360a-b may be positioned between top prongs 340a, 340c and bottom prongs 340b, 340d in an embodiment. Apertures 360a-b are generally adapted to receive a bolt that secures slider 160 to clevis 150 in an embodiment. Although illustrated as a circular aperture, apertures 360a-b may be any shape, such as an elliptical aperture or any other shape so that a bolt can be placed through apertures 360a-b. Additionally, apertures 360a-b may be adapted to receive a bolt of any size.

Bolt axis 380 may be an axis normal to apertures 360a-b in certain embodiments. Bolt axis 380 may define an axis through which the center of bolt 170 passes. Bolt axis 380 may be positioned at a center point of each of apertures 360a-b.

In operation, two components of mechanical system 110, such vertical tail spar 130 and rudder spar 140 of an aircraft, may be coupled together using clevis 150. Slider 160 may be positioned within clevis 150 on axis 152 and coupled to clevis 150 using bolt 170, which may be inserted through a hole of slider 160 into clevis bolt holes 151a-b. Stabilizing component 310 may be positioned within clevis 150 and coupled to clevis 150 using a fastener, an adhesive, or a sealant (such as polysulfide). For example, member 320a of stabilizing component 310 may be bonded to clevis side 155a using a sealant, and member 310b of stabilizing component 320b may be bonded to clevis side 155b using the sealant. Stabilizing component 310 may also be in contact with slider 160. For example, prongs 340a-d may each maintain contact with a portion of slider 160 in an embodiment. Because stabilizing component 310 is coupled to clevis 150 and maintains contact with slider 160, stabilizing component prevents slider 160 from rotating into clevis 150. As a result, many advantages are achieved.

Stabilizing component 310 has many advantages. Generally, stabilizing component 310 resists rotation of one component into an adjacent structural component thereby preventing damage to both components. For example, as a result of coupling stabilizing component 310 to clevis 150, and maintaining contact between each of prongs 340a-d and slider 160, stabilizing component 310 may prevent slider 160 from rotating into clevis 150. Because the repeated impacts of slider 160 into clevis 150 are eliminated, stabilizing component 310 prevents damage to both clevis 150 and slider 160. Additionally, preventing damage to these components will save replacement-part costs and increase workplace efficiency due to the elimination of the need to periodically inspect clevis 150 and slider 160. Moreover, stabilizing component 310 does not itself wear because it is not repeatedly abraded. Accordingly, stabilizing component 310 eliminates the need for a sacrificial part, such as a wear washer (which may not maintain contact with both the clevis and the slider). Another advantage of stabilizing component 310 is that is centers a component that has a tendency to rotate due to its operating environment, thereby providing an optimal alignment of that component. Yet another advantage of stabilizing component 310 is that its weight is typically less than the weight of traditional sacrificial parts because it is not repeatedly abraded thereby eliminating the need for it to be a thick part.

Modifications, additions, or omissions may be made to the embodiments described herein without departing from the scope of the present disclosure. Although embodiments of the present disclosure and their advantages have been described in detail, it should be understood that various other changes, substitutions, and alterations may be made hereto without departing from the spirit and scope of the invention as defined by the claims below. For example, although particular embodiments of the disclosure have been described with reference to an aircraft, the elements disclosed may apply to any other mechanical systems.

What is claimed is:

1. An apparatus, comprising:
    a first member and a second member for positioning the apparatus between a first arm and a second arm of an aircraft clevis, the first member and the second member each positioned on opposite sides of a longitudinal axis, the longitudinal axis being parallel to at least a portion of the first member and the second member and being substantially midway between the first member and the second member, the first member and the second member forming an opening at a first end, the opening configured to receive a slider positioned along the longitudinal axis;
    a u-shaped member coupling the first member and the second member at second end that is opposite to the first end, the longitudinal axis extending generally between the first and second end;
    a first prong protruding from a first edge at a top portion of the first member towards the longitudinal axis, the first edge substantially parallel to the longitudinal axis, at least a portion of the first prong for contacting the slider;
    a second prong protruding from a second edge at a bottom portion of the first member towards the longitudinal axis, the second edge substantially parallel to the longitudinal axis, at least a portion of the second prong for contacting the slider;
    a first aperture configured to receive a bolt, the first aperture positioned proximate to the first end of the first member;
    a third prong protruding from a third edge at a top portion of the second member towards the longitudinal axis, the third edge substantially parallel to the longitudinal axis, at least a portion of the third prong for contacting the slider;
    a fourth prong protruding from a fourth edge at a bottom portion of the second member towards the longitudinal axis, the fourth edge substantially parallel to the longitudinal axis, at least a portion of the fourth prong for contacting the slider; and
    a second aperture configured to receive the bolt, the second aperture positioned proximate to the first end of the second member;
    wherein:
        at least a portion of the first member is for coupling to the first arm of the aircraft clevis and
        the apparatus is operable to prevent the slider from contacting the aircraft clevis.

2. The apparatus of claim 1, wherein at least the portion of the first member is for coupling to the first arm of the aircraft clevis using an adhesive or a sealant.

3. The apparatus of claim 1, wherein at least the portion of the first member is for coupling to the first arm of the aircraft clevis using a fastener.

4. The apparatus of claim 1, wherein the first member and the second member each have at least a portion of a surface with an abrasion-resistant finish.

5. The apparatus of claim 1, wherein the first member and the second member are made of steel.

6. The apparatus of claim 1, wherein at least one of the first, second, third, or fourth prongs is shaped as a wave.

7. The apparatus of claim 6, wherein the wave comprises a portion that is straight.

8. An apparatus, comprising:
a first member and a second member, the first member and the second member each positioned on opposite sides of a longitudinal axis, the longitudinal axis being parallel to at least a portion of the first member and the second member and being positioned between the first member and the second member, the first member and the second member being interconnected at a first end, the first member and the second member forming an opening at a second end opposite to the first end, the opening configured to receive a slider positioned along the longitudinal axis, the longitudinal axis extending generally between the first end and the second end;
a first upper prong protruding from a first edge at a top portion of the first member towards the longitudinal axis, the first edge substantially parallel to the longitudinal axis;
a second upper prong protruding from a second edge at a top portion of the second member towards the longitudinal axis, the second edge substantially parallel to the longitudinal axis;
a first lower prong protruding from a third edge at a bottom portion of the first member towards the longitudinal axis, the third edge substantially parallel to the longitudinal axis; and
a second lower prong protruding from a fourth edge at a bottom portion of the second member towards the longitudinal axis, the fourth edge substantially parallel to the longitudinal axis;
wherein: at least a portion of the first member is for coupling to a first side of an aircraft clevis and at least a portion of the second member is for coupling to a second side of the aircraft clevis; at least a portion of each of the upper and lower prongs are for contacting the slider; and the apparatus is operable to prevent the slider from contacting the aircraft clevis.

9. The apparatus of claim 8, wherein at least the portion of the first member is for coupling to the first side of the clevis using an adhesive or a sealant.

10. The apparatus of claim 8, wherein at least the portion of the first member is for coupling to the first side of the clevis using a fastener.

11. The apparatus of claim 8, wherein the first member and the second member are made of steel.

12. The apparatus of claim 8, wherein the first member and the second member each have at least a portion of a surface with an abrasion-resistant finish.

13. The apparatus of claim 8, wherein at least one of the prongs is shaped as a wave.

14. The apparatus of claim 13, wherein the wave comprises a portion that is straight.

15. A system, comprising:
an aircraft clevis comprising two opposite sides and a longitudinal axis located between the two opposite sides, the longitudinal axis being parallel to the two opposite sides;
a slider positioned between the two sides of the aircraft clevis and along the longitudinal axis; and
a clip comprising the apparatus according to claim 1 or claim 8, the clip configured to prevent the slider from rotating about the longitudinal axis by having at least one of the first and second members of the clip coupled to one of the two opposite sides of the aircraft clevis and at least one prong of the clip in contact with the slider.

16. The system of claim 15, wherein the clip is coupled to one of the two opposite sides of the aircraft clevis using an adhesive or a sealant.

17. The system of claim 15, wherein the clip is coupled to one of the two opposite sides of the aircraft clevis using a fastener.

18. The system of claim 15, wherein the clip has a first surface with an abrasion-resistant finish.

19. The system of claim 15, wherein the clip is made of steel.

20. The system of claim 15, wherein the aircraft clevis is located in an airplane.

* * * * *